United States Patent
Beekman et al.

(10) Patent No.: US 8,234,877 B2
(45) Date of Patent: Aug. 7, 2012

(54) COMPRESSOR DISCHARGE VALVE PROVIDING FREEZE AND CHARGE MIGRATION PROTECTION

(75) Inventors: Dennis M. Beekman, La Crosse, WI (US); Jay H. Johnson, Houston, MN (US); Rodney L. Lakowske, La Crosse, WI (US); Sean A. Smith, La Crosse, WI (US); John R. Moilanen, La Crescent, MN (US)

(73) Assignee: Trane International Inc., Piscataway, NJ (US)

( * ) Notice: Subject to any disclaimer, the term of this patent is extended or adjusted under 35 U.S.C. 154(b) by 630 days.

(21) Appl. No.: 12/459,852

(22) Filed: Jul. 8, 2009

(65) Prior Publication Data

US 2011/0005251 A1     Jan. 13, 2011

(51) Int. Cl.
  F25B 31/00    (2006.01)
  F25B 43/02    (2006.01)
  F25B 41/00    (2006.01)
  F16K 31/44    (2006.01)

(52) U.S. Cl. ............ 62/193; 62/196.4; 62/470; 251/213

(58) Field of Classification Search ................. 62/228.3, 62/193, 196.4, 470; 251/213
See application file for complete search history.

(56) References Cited

U.S. PATENT DOCUMENTS

| | | | |
|---|---|---|---|
| 4,653,286 | A | 3/1987 | Huenniger |
| 4,749,166 | A | 6/1988 | Huenniger |
| 5,134,856 | A | 8/1992 | Pillis et al. |
| 5,170,640 | A | 12/1992 | Heitmann et al. |
| 5,603,227 | A | 2/1997 | Holden et al. |

*Primary Examiner* — Chen Wen Jiang
(74) *Attorney, Agent, or Firm* — William O'Driscoll

(57) ABSTRACT

A refrigerant system includes a compressor with a discharge valve that temporarily restricts the compressor's outflow at startup so that the discharge pressure can quickly rise to force lubricant back to the compressor. The discharge valve also helps prevent an axial face of a rotor of a screw compressor from rubbing against a bearing housing axial face of the compressor's housing. When the system turns off under certain low ambient air temperature conditions, the valve closes to help prevent the system's evaporator from freezing up. The discharge valve includes a novel arrangement of a piston, a valve stem extending from the piston, and a valve plug pivotally attached to the valve stem. The pivotal connection ensures a positive seal between the valve plug and a valve seat. A somewhat restricted fluid passageway between the valve's discharge chamber and piston chamber helps prevent the valve from chattering as the valve opens.

18 Claims, 3 Drawing Sheets

COMPRESSOR DISCHARGE VALVE PROVIDING FREEZE AND CHARGE MIGRATION PROTECTION

BACKGROUND OF THE INVENTION

1. Field of the Invention

The subject invention generally pertains to refrigerant systems and more specifically to a compressor discharge valve that provides freeze and charge migration protection.

2. Description of Related Art

Various valves have been developed to ensure a refrigerant compressor has adequate lubrication at startup. Such valves typically restrict a compressor's initial discharge of refrigerant to quickly increase the discharge pressure so that the pressure is sufficient to force lubricant back to the compressor. Examples of such valves are disclosed in U.S. Pat. No. 5,134,856 (Pillis) and U.S. Pat. No. 5,170,640 (Heitmann).

The Pillis valve includes a piston with a bleed hole (50) that allows high-pressure refrigerant to flow from a front side of the piston to a back side of the piston. Opening a solenoid valve (46) releases the high-pressure refrigerant at the back side of the piston so that the high-pressure refrigerant at the piston's front side can force the valve open. The addition of solenoid valve (46) and having to control it is a drawback of the Pillis valve.

The Heitmann valve opens by using refrigerant at discharge pressure to force a piston (34) away from its valve seat (30). To avoid chatter when the valve is fully open, piston (34) bottoms out against a plate (40). Chatter might still occur, however, when the valve first begins opening. Just before the valve opens, for instance, a buildup of discharge pressure might be barely enough to start opening the valve. Once slightly open, the valve might pass enough refrigerant to decrease the discharge pressure to a point where the valve closes. With the valve closed, discharge pressure can once again build to open the valve back up. A repeat of such a cycle in rapid succession can result in chatter. Other causes of rapidly fluctuating discharge pressure can also be a source of valve chatter.

Consequently, there appears to be an ongoing need for a simple and effective discharge valve for a refrigerant compressor.

SUMMARY OF THE INVENTION

It is an object of some embodiments of the invention to provide a compressor with a discharge valve that ensures adequate oil return to the compressor at startup.

Another object of some embodiments is to provide a refrigerant system with a compressor discharge valve that helps prevent an evaporator from freezing when the system shuts down during low ambient temperature conditions.

Another object of some embodiments to prevent chatter in a compressor discharge valve by providing the valve with a somewhat restricted fluid passageway between the valve's discharge chamber and piston chamber.

Another object of some embodiments is to provide a discharge valve with an extended valve stem. To ensure positive valve closure, the valve includes a stem guide, and the valve stem is pivotally coupled to a valve plug.

Another object of some embodiments is to provide valve stem with a pivotal valve plug that is urged to a substantially perpendicular position relative to the valve stem when the valve is open but can tilt relative to the valve stem when the valve is closed.

Another object of some embodiments is control a compressor discharge valve without having to rely on solenoid valves to do so.

Another object of some embodiments is to minimize the flow restriction through a compressor discharge valve when the valve is open.

Another object of some embodiments is to develop and maintain a desired discharge pressure and avoid chatter by opening a discharge valve in a relatively slow, controlled manner.

Another object of some embodiments is to provide a discharge valve that regulates a compressor's discharge pressure by positioning a valve plug at an intermediate position between the valve's fully open and closed positions.

Another object of some embodiments is to provide a screw compressor with a discharge valve that helps prevent the compressor's rotor from rubbing against an endplate of the compressor's housing.

One or more of these and/or other objects of the invention are provided by a compressor discharge valve that restricts discharge flow to promote an increase in discharge pressure. The discharge valve ensures proper oil return to the compressor while avoiding chatter as the valve begins to open.

The present invention provides a discharge valve for a compressor of a refrigerant system that circulates a refrigerant to create a high-pressure side and a low-pressure side. The discharge valve comprises a valve housing defining a discharge chamber, a piston chamber, a valve inlet, a valve outlet, and a valve actuator port. The discharge valve also comprises a piston disposed within the piston chamber so as to substantially isolate the valve actuator port from the discharge chamber. The discharge valve also comprises a valve seat. The discharge valve also comprises a valve plug disposed within the discharge chamber and being movable relative to the valve seat between a closed position and an open position. The valve plug in the closed position sealingly engages the valve seat to block refrigerant flow from the valve inlet to the valve outlet. The valve plug in the open position is spaced apart from the valve seat to permit refrigerant flow from the valve inlet to the valve outlet. The discharge valve further comprises a spring disposed within one of the piston chamber and the discharge chamber to urge the valve plug toward the valve seat. The discharge valve further comprises a stem guide disposed within the discharge chamber, wherein the stem guide defines a fluid passageway connecting the piston chamber in fluid communication with the discharge chamber. The valve stem is slidingly disposed within the stem guide. The valve stem couples the piston to the valve plug such movement of the piston within the piston chamber moves the valve plug relative to the valve seat; the valve plug, to a limited extent, is axially movable relative to the valve stem; and the valve plug is pivotally attached to the valve stem.

The present invention also provides a refrigerant system circulating a refrigerant to create a high-pressure side and a low-pressure side. The refrigerant system comprises a compressor defining a discharge port at the high-pressure side, defining a suction port at the low-pressure side, and defining an oil inlet. The compressor is operable to compress the refrigerant to create a pressure differential between the high-pressure side and the low-pressure side. The system also comprises an oil separator defining a refrigerant inlet, a refrigerant outlet, and an oil outlet, wherein the refrigerant inlet is in fluid communication with the discharge port of the compressor. The system further comprises an oil return conduit connecting the oil outlet of the oil separator in fluid communication with the oil inlet of the compressor. The system further comprises an evaporator defining an evaporator inlet and an evaporator outlet, wherein the evaporator outlet is connected in fluid communication with the suction port of the compressor. The system further comprises a condenser defining a condenser inlet and a condenser outlet. The system also comprises an expansion device connecting the condenser outlet in fluid communication with the evaporator inlet. The discharge valve defines a discharge chamber, a piston chamber, a valve inlet connected in fluid communication with the refrigerant outlet of the oil separator, a valve outlet connected in fluid communication with the condenser inlet, and a valve actuator port connected in fluid communication with the condenser inlet. The discharge valve comprises a piston disposed within the piston chamber so as to substantially isolate the valve actuator port from the discharge chamber. The discharge valve also comprises a valve seat. The discharge valve further comprises a valve plug disposed within the discharge chamber and being movable relative to the valve seat between a closed position and an open position, wherein valve plug in the closed position sealingly engages the valve seat to block refrigerant flow from the valve inlet to the valve outlet. The valve plug in the open position is spaced apart from the valve seat to permit refrigerant flow from the valve inlet to the valve outlet. The valve plug moves to the closed position in response to the pressure differential between the high-pressure side and the low-pressure side being below a predetermined limit. The valve plug moves toward the open position in response to the pressure differential between the high-pressure side and the low-pressure side being at least as great as the predetermined limit. The discharge valve further comprises a spring disposed within one of the piston chamber and the discharge chamber to urge the valve plug toward the valve seat. The discharge valve further comprises a stem guide disposed within the discharge chamber. The stem guide defines a fluid passageway connecting the piston chamber in fluid communication with the discharge chamber. The discharge further comprises a valve stem slidingly disposed within the stem guide, wherein the valve stem couples the piston to the valve plug such that movement of the piston within the piston chamber moves the valve plug relative to the valve seat.

The present invention further provides a refrigerant system circulating a refrigerant to create a high-pressure side and a low-pressure side. The refrigerant system comprises a compressor that includes a compressor housing defining a discharge port at the high-pressure side, defining a suction port at the low-pressure side, and defining an oil inlet. The compressor is operable to compress the refrigerant to create a pressure differential between the high-pressure side and the low-pressure side. The compressor includes a screw rotor supported by a rolling element bearing within the compressor housing. The rolling element bearing allows an axial face of the screw rotor to rub against a bearing housing axial face of the compressor housing under certain pressure conditions. The rolling element bearing allows the axial face of the screw rotor to move away from the bearing housing axial face in a spaced-apart relationship therewith. The rolling element bearing limits how far the axial face of the screw rotor can move away from the bearing housing axial face of the compressor housing. The refrigerant pushes the axial face of the screw rotor away from the bearing housing axial face of the compressor housing when the pressure differential between the high-pressure side and the low-pressure side is at least as great as the predetermined limit. The refrigerant system also comprises an oil separator defining a refrigerant inlet, a refrigerant outlet, and an oil outlet, wherein the refrigerant inlet is in fluid communication with the discharge port of the compressor. The refrigerant system further comprises an oil return conduit connecting the oil outlet of the oil separator in fluid communication with the oil inlet of the compressor. The refrigerant system also comprises an evaporator defining an evaporator inlet and an evaporator outlet, wherein the evaporator outlet is connected in fluid communication with the suction port of the compressor. The refrigerant system also comprises a condenser defining a condenser inlet and a condenser outlet. The refrigerant system also comprises an expansion device connecting the condenser outlet in fluid communication with the evaporator inlet. The refrigerant system also comprises a discharge valve defining a discharge chamber, a piston chamber, a valve inlet connected in fluid communication with the refrigerant outlet of the oil separator, a valve outlet connected in fluid communication with the condenser inlet, and a valve actuator port connected in fluid communication with the condenser inlet. The discharge valve comprises a piston disposed within the piston chamber so as to substantially isolate the valve actuator port from the discharge chamber. The discharge valve further comprises a valve seat. The discharge valve further comprises a valve plug disposed within the discharge chamber and being movable relative to the valve seat between a closed position and an open position, wherein valve plug in the closed position sealingly engages the valve seat to block refrigerant flow from the valve inlet to the valve outlet, and the valve plug in the open position is spaced apart from the valve seat to permit refrigerant flow from the valve inlet to the valve outlet. The valve plug moves to the closed position in response to the pressure differential between the high-pressure side and the low-pressure side being below a predetermined limit. The valve plug moves toward the open position in response to the pressure differential between the high-pressure side and the low-pressure side being at least as great as the predetermined limit. The discharge valve further comprises a spring disposed within one of the piston chamber and the discharge chamber to urge the valve plug toward the valve seat. The discharge valve further comprises a stem guide disposed within the discharge chamber, wherein the stem guide defines a fluid passageway connecting the piston chamber in fluid communication with the discharge chamber. The discharge valve further comprises a valve stem slidingly disposed within the stem guide. The valve stem couples the piston to the valve plug such that movement of the piston within the piston chamber moves the valve plug relative to the valve seat.

DESCRIPTION OF THE PREFERRED EMBODIMENT

Figure 1:
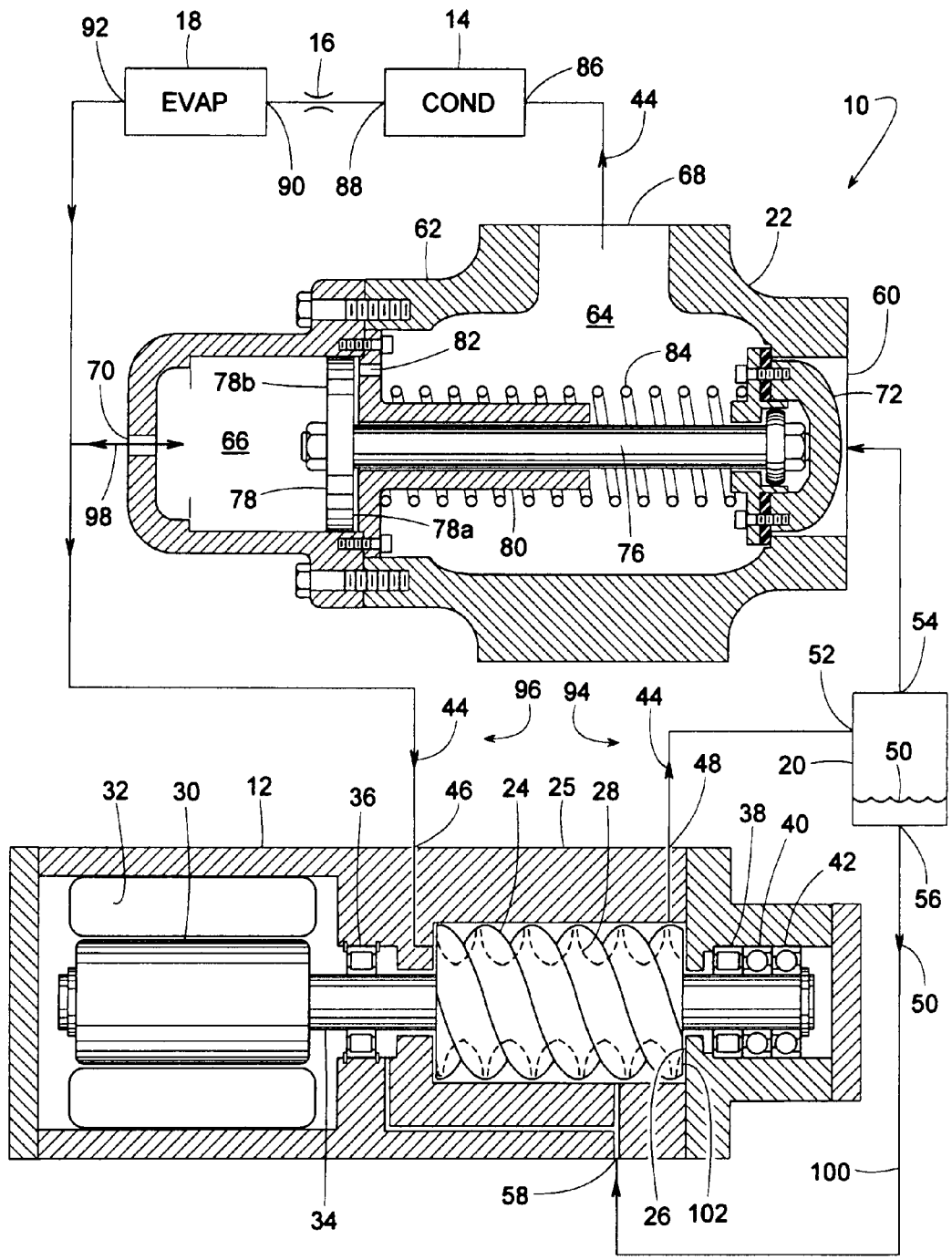
FIG. 1 is a schematic diagram of a refrigerant system including an example of a discharge valve according to the present invention.

FIG. 1 schematically illustrates a refrigerant system 10 comprising a refrigerant compressor 12, a condenser 14, an expansion device 16, and an evaporator 18. System 10 also includes an oil separator 20 and a novel discharge valve 22. The various components are drawn out of scale to illustrate certain key features. Discharge valve 22 provides several benefits including, but not limited to, protecting evaporator 18 from freezing under certain conditions; ensuring proper lubrication of compressor 12 at startup; and preventing or minimizing axial rubbing between a screw rotor 24 and a bearing housing axial face 26 of compressor 12.

Although compressor 12 represents any type of compressor, compressor 12 is shown as being a screw compressor, as such a compressor can particularly benefit from the use of discharge valve 22. For the illustrated example, compressor 12 comprises a compressor housing 25 (which includes bearing housing axial face 26), two intermeshing screw compressor rotors 24 and 28, a motor rotor 30 rotated by a magnetic field of a stator 32, a drive shaft 34 that couples motor rotor 30 to compressor rotor 24, and various rolling element bearings 36, 38, 40 and 42 that support shaft 34 and rotors 30 and 24. The rotation of rotor 24 with rotor 28 draws in a refrigerant 44 at a suction port 46, compresses the refrigerant, and discharges the refrigerant out through a discharge port 48.

The location of suction port 46 and the path through which the refrigerant flows through compressor 12 is schematically illustrated and may vary from what is shown in FIG. 1. In some examples, for instance, the suction port is more toward the motor end of the compressor, and the refrigerant flows from the suction port and through the "air" gap between the stator and the motor rotor prior to entering the suction end of the screw rotors.

In any case, after compression, the refrigerant along with some entrained lubricating oil 50 is discharged to a refrigerant inlet 52 of oil separator 20, wherein oil 50 separates from the refrigerant and settles at the bottom of separator 20.

Oil separator 20 has a refrigerant outlet 54 and an oil outlet 56. Oil outlet 56 returns oil 50 to an oil inlet 58 of compressor 12 to lubricate bearings 36, 38, 40 and 42; a slide valve within housing 25; and rotors 24 and 28. To promote oil flow from oil outlet 56 to oil inlet 58 and to effectively lubricate all moving parts of compressor 12, oil inlet 58 is at a pressure that is closer to that of discharge port 48 (high-pressure side) than that of suction port 46 (low-pressure side). While oil 50 is returned to compressor 12, refrigerant outlet 54 of oil separator 20 releases compressed refrigerant to a valve inlet 60 of discharge valve 22.

For the illustrated example, discharge valve 22 comprises a valve housing 62 defining a discharge chamber 64, a piston chamber 66, valve inlet 60, at least one valve outlet 68, and a valve actuator port 70. A valve plug 72 disposed within discharge chamber 64 is movable between an open position (FIG. 3) and a closed position (FIGS. 1 and 2) relative to a valve seat 74 in valve housing 62. A valve stem 76 connects valve plug 72 to a piston 78 disposed in piston chamber 66 such that piston 78 moving axially along chamber 66 moves valve stem 76. A stem guide 80 in discharge chamber 64 helps guide the movement of valve stem 76 and thus also guides the movement of valve plug 72. Stem guide 80 has a fluid passageway 82 that provides restricted fluid communication between discharge chamber 64 and a rod-side 78a of piston 78. Pressure at valve actuator port 70 of housing 62 is applied to a cylinder-side 78b of piston 78.

Figure 2:
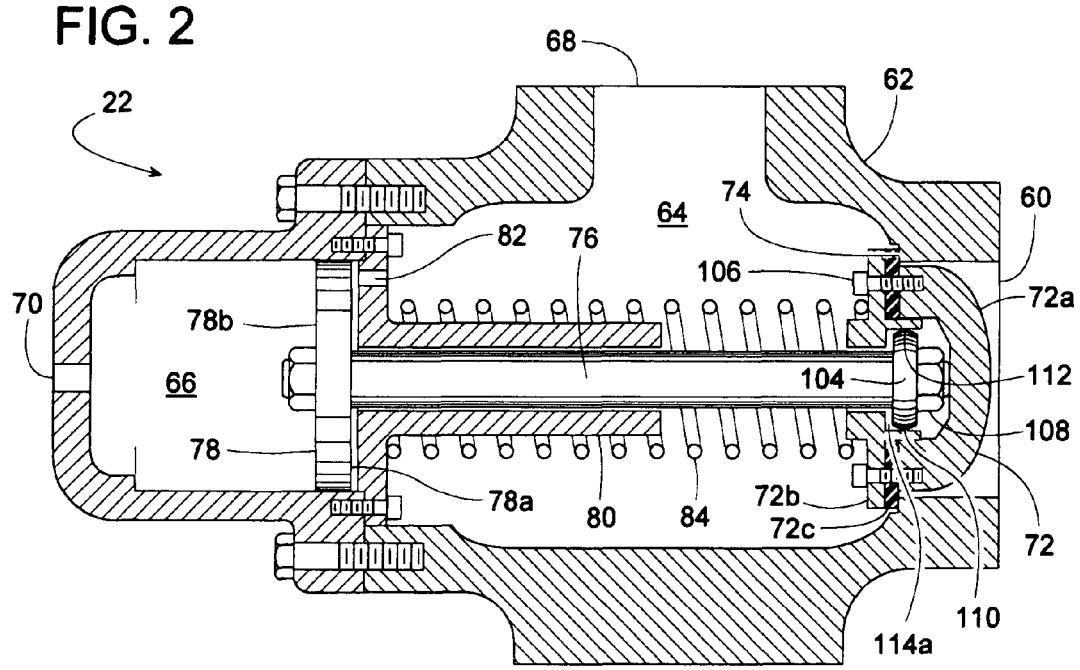
FIG. 2 is a cross-sectional view of the valve shown in FIG. 1 with the valve shown in a closed position.
Figure 3:
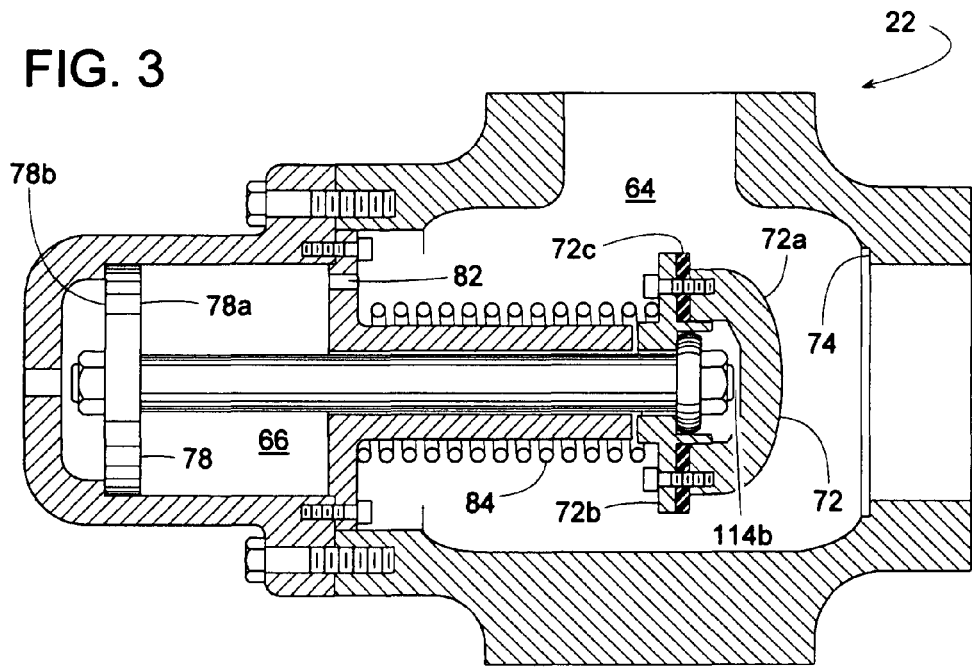
FIG. 3 is a cross-sectional view similar to FIG. 2 but showing the valve in a fully open position.
Figure 4:
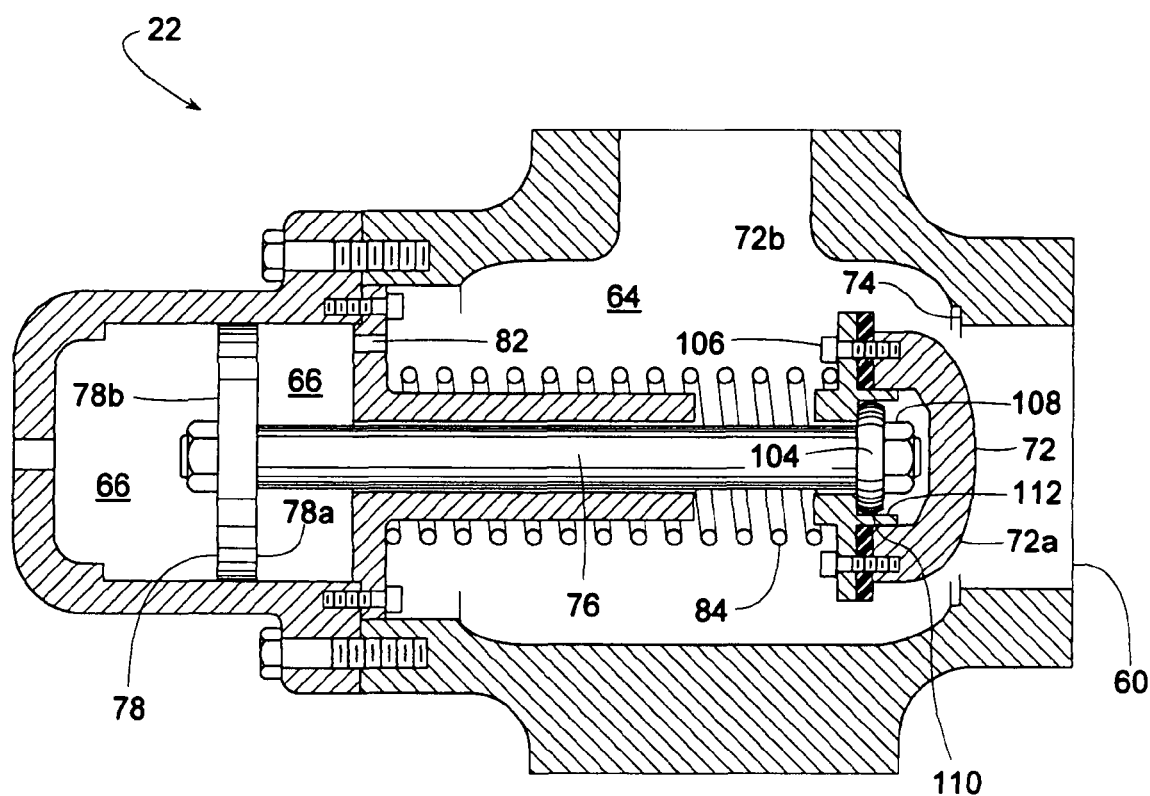
FIG. 4 is a cross-sectional view similar to FIGS. 2 and 3 but showing the valve in an intermediate open position.

Refrigerant pressure against cylinder-side 78b and a compression spring 84 in discharge chamber 64 (or in piston chamber 66) urges valve plug 72 to its closed position (FIGS. 1 and 2). Refrigerant pressure at valve inlet 60 and applied against valve plug 22 plus refrigerant pressure within piston chamber 66 and applied against rod-side 78a of piston 78 urges valve plug 72 toward its open position (FIG. 3). FIG. 4 shows valve plug 72 at an intermediate open position where valve 22 throttles the flow of refrigerant from valve inlet 60 to valve outlet 68.

When valve 22 is at least partially open, gaseous refrigerant at relatively high temperature and pressure flows sequentially from discharge port 48 of compressor 12, through oil separator 20, through valve inlet 60, through discharge chamber 64, out through valve outlet 68, into a condenser inlet 86 of condenser 14, through condenser 14, and out through a condenser outlet 88 of condenser 14. As the refrigerant flows through condenser 14, the refrigerant releases heat to a secondary fluid (e.g., water, outdoor air, etc.), whereby the refrigerant is cooled and condensed. The now cooler, liquid refrigerant flows through expansion device 16, which causes the refrigerant to cool further by expansion. Expansion device 16 is schematically illustrated to represent any significant flow restriction. Examples of device 16 include, but are not limited to, an electronic expansion valve, a thermal expansion valve, fixed or variable orifice, capillary, etc. After passing through expansion device 16, the refrigerant enters evaporator 18 through an evaporator inlet 90. The refrigerant flows through evaporator 18 to cool another fluid (e.g., water, indoor air of a comfort zone, etc.) and then exits evaporator 18 through an evaporator outlet 92. From there, the refrigerant returns to suction port 46 of compressor 12 to be recompressed, thereby perpetuating the refrigerant cycle.

The pressure differential across compressor 12 provides system 10 with a high-pressure side 94 and a low-pressure side 96. Oil separator 20 connects high-pressure side 94 in fluid communication with valve inlet 60, and a line 98 connects low-pressure side 96 in fluid communication with valve actuator port 70. If the compressor's discharge pressure or the pressure differential between high-pressure side 94 and low-pressure side 96 is too low or below a predetermined limit, the pressure may be insufficient to force oil 50 through an oil return conduit 100 back to oil inlet 58 of compressor 12.

Moreover, insufficient discharge pressure may allow rotor 24 to shift axially to the right (as viewed in FIG. 1), which can cause an axial face 102 of rotor 24 to rub against bearing housing axial face 26 of compressor 12. This is particularly true for screw rotors that are supported by an angular-contact rolling element bearing (e.g., bearings 40 and 42) because such a bearing serves as a thrust bearing that limits how far the rotor can move away from a screw compressor bearing housing axial face but provides little if any resistance to the rotor moving toward the bearing housing axial face.

To prevent the rubbing and oil return problems, valve 22 remains closed until forced open by the compressor's discharge pressure (relative to the suction pressure) exceeds the predetermined pressure threshold. If, for instance, the discharge pressure is relatively low due to compressor 12 just starting and/or condenser 14 being particularly cold (low ambient air temperature conditions), then the resulting low discharge pressure at valve inlet 60 against valve plug 72 plus the pressure in discharge chamber 64 applied to rod-side 78a of piston 78 is insufficient to overcome the combined forces of spring 84 and the suction pressure against cylinder side 78b of piston 78, thus spring 84 and the suction pressure on cylinder-side 78b of piston 78 pushes valve plug 72 to its closed position of FIGS. 1 and 2.

Valve 22 in the closed position allows compressor 12 to quickly increase the pressure in oil separator 20. The higher pressure forces oil 50 back to compressor 12 and forces axial face 102 of rotor 24 away from bearing housing axial face 26.

Once the discharge pressure exceeds the predetermined limit (which can take multiple revolutions of rotor 24) the discharge pressure at inlet 60 against valve plug 72 and/or the pressure in discharge chamber 64 and applied via passageway 82 to rod-side 78a of piston 78 overcomes the combined forces of spring 84 and the suction pressure against cylinder side 78b of piston 78, thereby moving valve plug 72 to its open position of FIG. 3. With valve 22 fully open, refrigerant system 10 can operate in a "normal" steady state condition.

As valve plug 72 passes through an intermediate position (FIG. 4) upon moving from its closed to open positions, the restriction of passageway 82 helps prevent valve 22 from chattering (i.e., prevents valve plug 72 from fluttering against valve seat 74. Avoiding chatter is achieved by passageway 82 providing somewhat of a flow restriction that helps dampen pressure fluctuations that may occur in discharge chamber 64. Thus, the pressure against rod-side 78a does not change or fluctuate as fast as the pressure in discharge chamber 64.

Discharge valve 22 also offers utility when compressor 12 shuts down while condenser 14 is exposed to rather low outdoor air temperature conditions. Immediately or soon after shutdown during such conditions, discharge valve 22 automatically closes to prevent a momentary flow of refrigerant from evaporator 18, through compressor 12, and to condenser 14. If not stopped by valve 22 being closed, such a flow of refrigerant could possibly freeze up evaporator 18.

To ensure positive sealing contact between valve plug 72 and valve seat 74 when valve 22 is closed, valve plug 72 has a polymeric seal 72c (e.g., elastomer) clamped between a valve plug cap 72a and a valve plug ring 72b, wherein seal 72c can compliantly seal against valve seat 74. To further ensure positive sealing between valve plug 72 and valve seat 74 (sealing between seal 72c and valve seat 74), valve plug 72 is pivotally attached to the end of valve stem 76. Valve stem 76 has a spherical collar 104 captured between cap 72a and ring 72b of valve plug 72. A fastener 106 (e.g., a screw} connects ring 72b to cap 72a (with seal 72c clamped therebetween), and another fastener 108 (e.g., a nut) connects collar 104 to the shank of valve stem 76. A spherical outer periphery 110 of collar 104 can pivot to a limited extent relative to an inner periphery 112 of ring 72b or cap 72a so that valve plug 72 can tilt if necessary to seal tightly against valve seat 74. When valve 22 opens, however, spring 84 pushing ring 72b against an axial face of collar 104 urges valve plug 72 to a position that is substantially perpendicular to valve stem 76. To facilitate such pivotal movement, some axial play exists between valve stem 76 and valve plug 72. The axial play is identified as clearance 114a in FIG. 2 and clearance 114b in FIG. 3.

It should be appreciated by those of ordinary skill in the art that refrigerant system 10 can of course deviate from the layout schematically illustrated in FIG. 1. Valve actuator port 70, for example, can be connected anywhere on low-pressure side 96 including, but not limited to, immediately downstream of expansion device 16, at evaporator inlet 90, at evaporator outlet 92, at an intermediate point between inlet 90 and outlet 92, and at suction port 46 of compressor 12. Discharge valve 22 can have just one valve outlet 68, as shown, or can have multiple valve outlets 68. Oil return conduit 100 can be an external tube, or conduit 100 can be one or more internal fluid passageways incorporated within compressor housing 25. Likewise, oil separator 20, discharge valve 22, and compressor housing 25 can be interconnected by way of external tubes, or two or more of items 20, 22 and 26 can bolt together or share a common housing. Piston 78 may include a piston ring or peripheral seal to prevent refrigerant from leaking past piston 78. Stem guide 80 preferably includes an integral glide bearing to minimize wear between valve stem 76 and the central bore of stem guide 80.

Although the invention is described with respect to a preferred embodiment, modifications thereto will be apparent to those of ordinary skill in the art. The scope of the invention, therefore, is to be determined by reference to the following claims:

The invention claimed is:

1. A refrigerant system circulating a refrigerant to create a high-pressure side and a low-pressure side, the refrigerant system comprising:
   a compressor defining a discharge port at the high-pressure side, defining a suction port at the low-pressure side, and defining an oil inlet, the compressor being operable to compress the refrigerant to create a pressure differential between the high-pressure side and the low-pressure side;
   an oil separator defining a refrigerant inlet, a refrigerant outlet, and an oil outlet, wherein the refrigerant inlet is in fluid communication with the discharge port of the compressor;
   an oil return conduit connecting the oil outlet of the oil separator in fluid communication with the oil inlet of the compressor;
   an evaporator defining an evaporator inlet and an evaporator outlet, wherein the evaporator outlet is connected in fluid communication with the suction port of the compressor;
   a condenser defining a condenser inlet and a condenser outlet;
   an expansion device connecting the condenser outlet in fluid communication with the evaporator inlet; and
   a discharge valve defining a discharge chamber, a piston chamber, a valve inlet connected in fluid communication with the refrigerant outlet of the oil separator, a valve outlet connected in fluid communication with the condenser inlet, and a valve actuator port connected in fluid communication with the condenser inlet, the discharge valve comprises:
   a) a piston disposed within the piston chamber so as to substantially isolate the valve actuator port from the discharge chamber;
   b) a valve seat;
   c) a valve plug disposed within the discharge chamber and being movable relative to the valve seat between a closed position and an open position, wherein valve plug in the closed position sealingly engages the valve seat to block refrigerant flow from the valve inlet to the valve outlet, and the valve plug in the open position is spaced apart from the valve seat to permit refrigerant flow from the valve inlet to the valve outlet, the valve plug moves to the closed position in response to the pressure differential between the high-pressure side and the low-pressure side being below a predetermined limit, the valve plug moves toward the open position in response to the pressure differential between the high-pressure side and the low-pressure side being at least as great as the predetermined limit;
   d) a spring disposed within one of the piston chamber and the discharge chamber to urge the valve plug toward the valve seat;
   e) a stem guide disposed within the discharge chamber, the stem guide defines a fluid passageway connecting the piston chamber in fluid communication with the discharge chamber; and
   f) a valve stem slidingly disposed within the stem guide, the valve stem couples the piston to the valve plug such that movement of the piston within the piston chamber moves the valve plug relative to the valve seat.

2. The refrigerant system of claim 1, wherein the valve plug to a limited extent is axially movable relative to the valve stem.

3. The refrigerant system of claim 1, wherein the valve plug is pivotally attached to the valve stem.

4. The refrigerant system of claim 1, wherein the spring is disposed within the discharge chamber.

5. The refrigerant system of claim 1, wherein the valve plug moves between the closed position and the open position such that whenever the compressor is operating:
   a) in the open position, the discharge valve conveys refrigerant from the high-pressure side to the condenser,
   b) in the closed position, the discharge valve blocks refrigerant from flowing from the compressor to the condenser,
   c) refrigerant pressure at the high-pressure side continuously urges the discharge valve toward the open position, and
   d) the spring and refrigerant pressure at the low-pressure side continuously urges the discharge valve toward the closed position.

6. The refrigerant system of claim 1, wherein the compressor includes a screw rotor disposed within a compressor housing, the screw rotor has an axial face that rotates in proximity with a bearing housing axial face of the compressor housing, the bearing housing axial face is substantially parallel to the axial face of the screw rotor, the axial face of the screw rotor can rub against the bearing housing axial face under certain pressure conditions, the refrigerant pushes the axial face of the screw rotor away from the bearing housing axial face of the compressor housing when the pressure differential between the high-pressure side and the low-pressure side is at least as great as the predetermined limit.

7. The refrigerant system of claim 6, further comprising a rolling element bearing that supports the screw rotor within the compressor housing, the rolling element bearing allows the axial face of the screw rotor to rub against the bearing housing axial face of the compressor housing, the rolling element bearing allows the axial face of the screw rotor to move away from the bearing housing axial face in a spaced-apart relationship therewith, the rolling element bearing limits how far the axial face of the screw rotor can move away from the bearing housing axial face of the compressor housing.

8. The refrigerant system of claim 1, wherein the oil inlet of the compressor is at a pressure that is closer to that of the high-pressure side than that of the low-pressure side.

9. The refrigerant system of claim 1, wherein the compressor includes a screw rotor that upon some startups makes at least one revolution before the valve plug moves completely over to the open position.

10. The refrigerant system of claim 1, wherein the compressor includes a screw rotor that upon some startups makes at least one revolution while the valve plug remains in the closed position.

11. A refrigerant system circulating a refrigerant to create a high-pressure side and a low-pressure side, the refrigerant system comprising:
   a compressor that includes a compressor housing defining a discharge port at the high-pressure side, defining a suction port at the low-pressure side, and defining an oil inlet, the compressor being operable to compress the refrigerant to create a pressure differential between the high-pressure side and the low-pressure side, the compressor includes a screw rotor supported by a rolling element bearing within the compressor housing, the rolling element bearing allows an axial face of the screw rotor to rub against a bearing housing axial face of the compressor housing under certain pressure conditions, the rolling element bearing allows the axial face of the screw rotor to move away from the bearing housing axial face in a spaced-apart relationship therewith, the rolling element bearing limits how far the axial face of the screw rotor can move away from the bearing housing axial face of the compressor housing, the refrigerant pushes the axial face of the screw rotor away from the bearing housing axial face of the compressor housing when the pressure differential between the high-pressure side and the low-pressure side is at least as great as the predetermined limit;
   an oil separator defining a refrigerant inlet, a refrigerant outlet, and an oil outlet, wherein the refrigerant inlet is in fluid communication with the discharge port of the compressor;
   an oil return conduit connecting the oil outlet of the oil separator in fluid communication with the oil inlet of the compressor;
   an evaporator defining an evaporator inlet and an evaporator outlet, wherein the evaporator outlet is connected in fluid communication with the suction port of the compressor;
   a condenser defining a condenser inlet and a condenser outlet;
   an expansion device connecting the condenser outlet in fluid communication with the evaporator inlet; and
   a discharge valve defining a discharge chamber, a piston chamber, a valve inlet connected in fluid communication with the refrigerant outlet of the oil separator, a valve outlet connected in fluid communication with the condenser inlet, and a valve actuator port connected in fluid communication with the condenser inlet, the discharge valve comprises:
   a) a piston disposed within the piston chamber so as to substantially isolate the valve actuator port from the discharge chamber;
   b) a valve seat;
   c) a valve plug disposed within the discharge chamber and being movable relative to the valve seat between a closed position and an open position, wherein valve plug in the closed position sealingly engages the valve seat to block refrigerant flow from the valve inlet to the valve outlet, and the valve plug in the open position is spaced apart from the valve seat to permit refrigerant flow from the valve inlet to the valve outlet, the valve plug moves to the closed position in response to the pressure differential between the high-pressure side and the low-pressure side being below a predetermined limit, the valve plug moves toward the open position in response to the pressure differential between the high-pressure side and the low-pressure side being at least as great as the predetermined limit;
   d) a spring disposed within one of the piston chamber and the discharge chamber to urge the valve plug toward the valve seat;
   e) a stem guide disposed within the discharge chamber, the stem guide defines a fluid passageway connecting the piston chamber in fluid communication with the discharge chamber; and
   f) a valve stem slidingly disposed within the stem guide, the valve stem couples the piston to the valve plug such that movement of the piston within the piston chamber moves the valve plug relative to the valve seat.

12. The refrigerant system of claim 11, wherein the valve plug to a limited extent is axially movable relative to the valve stem.

13. The refrigerant system of claim 11, wherein the valve plug is pivotally attached to the valve stem.

14. The refrigerant system of claim 11, wherein the spring is disposed within the discharge chamber.

15. The refrigerant system of claim 11, wherein the valve plug moves between the closed position and the open position such that whenever the compressor is operating:
   e) in the open position, the discharge valve conveys refrigerant from the high-pressure side to the condenser,
   f) in the closed position, the discharge valve blocks refrigerant from flowing from the compressor to the condenser,
   g) refrigerant pressure at the high-pressure side continuously urges the discharge valve toward the open position, and
   h) the spring and refrigerant pressure at the low-pressure side continuously urges the discharge valve toward the closed position.

16. The refrigerant system of claim 11, wherein the oil inlet of the compressor is at a pressure that is closer to that of the high-pressure side than that of the low-pressure side.

17. The refrigerant system of claim 11, wherein the screw rotor upon some startups makes at least one revolution before the valve plug moves completely over to the open position.

18. The refrigerant system of claim 11, wherein the screw rotor upon some startups makes at least one revolution while the valve plug remains in the closed position.

* * * * *